(12) United States Patent
Mitomi et al.

(10) Patent No.: US 7,869,669 B2
(45) Date of Patent: Jan. 11, 2011

(54) OPTICAL PHASE MODULATOR

(75) Inventors: Osamu Mitomi, Sagamihara (JP); Kenji Aoki, Nagoya (JP); Jungo Kondo, Nishikamo-gun (JP); Yuichi Iwata, Nagoya (JP); Tetsuya Ejiri, Kasugai (JP); Akiyoshi Ide, West Bloomfield, MI (US)

(73) Assignee: NGK Insulators, Ltd., Aichi (JP)

( * ) Notice: Subject to any disclaimer, the term of this patent is extended or adjusted under 35 U.S.C. 154(b) by 0 days.

(21) Appl. No.: 12/510,535

(22) Filed: Jul. 28, 2009

(65) Prior Publication Data

US 2009/0290830 A1    Nov. 26, 2009

Related U.S. Application Data

(63) Continuation of application No. PCT/JP2008/052605, filed on Feb. 12, 2008.

(30) Foreign Application Priority Data

Mar. 6, 2007    (JP) .............................. 2007-055261

(51) Int. Cl.
    *G02F 1/035*    (2006.01)
(52) U.S. Cl. ......................................................... 385/3
(58) Field of Classification Search ....................... None
     See application file for complete search history.

(56) References Cited

U.S. PATENT DOCUMENTS

| | | | |
|---|---|---|---|
| 5,074,631 A | 12/1991 | Hamano et al. | |
| 6,449,080 B1 | 9/2002 | McBrien et al. | |
| 2003/0007711 A1 | 1/2003 | Sugamata et al. | |
| 2004/0136655 A1 | 7/2004 | Aoki et al. | |
| 2006/0120654 A1* | 6/2006 | Aoki et al. | ...... 385/2 |
| 2007/0104407 A1* | 5/2007 | Mitomi et al. | ...... 385/8 |
| 2009/0154867 A1* | 6/2009 | Iwata et al. | ...... 385/2 |

FOREIGN PATENT DOCUMENTS

| | | |
|---|---|---|
| JP | 02-269309 A1 | 11/1990 |
| JP | 09-211403 A1 | 8/1997 |
| JP | 2000-249995 A1 | 9/2000 |
| JP | 2001-255501 A1 | 9/2001 |
| JP | 2001-290115 A1 | 10/2001 |
| JP | 2004-219600 A1 | 8/2004 |
| JP | 2005-091698 A1 | 4/2005 |

* cited by examiner

OTHER PUBLICATIONS

Masayuki Izutsu, et al., "Band Operation of Guided-Wave Light Modulators with Filter-Type Coplanar Electrodes," IEICE Trans. Electron. vol. E78-C, No. 1, Jan. 1995, pp. 55-59.

*Primary Examiner*—Sung H Pak
(74) *Attorney, Agent, or Firm*—Cermak Nakajima LLP; Tomoko Nakajima

(57) ABSTRACT

The invention provides an optical phase modulator having a substrate made of an electro-optical material, a signal electrode provided on the substrate and first and second ground electrodes provided on both sides of the signal electrode. The electrodes are provided so that a size of the first gap between the first ground electrode and the signal electrode is smaller than a size of a second gap between the second ground electrode and the signal electrode. Furthermore, an optical waveguide is provided in the first gap as an optical phase modulator and not provided in the second gap. A driving voltage required for the phase adjustments is thereby lowered, the impedance matching is easily made and excellent radio frequency property can be realized.

10 Claims, 7 Drawing Sheets

OPTICAL PHASE MODULATOR

TECHNICAL FIELD

The present invention relates to an optical phase modulator.

BACKGROUND ART

"Band Operation of Guided-Wave Light Modulators with Filter-Type Coplanar Electrodes", IEICE TRANS. ELECTRON., VOL. E78-C, No. 1, January 1995 discloses a optical phase modulator using so-called ACPS electrodes. In this modulator, a channel optical waveguide is formed between a ground electrode and a signal electrode of the ACPS electrodes, and a voltage is impressed on the optical waveguide, thereby modulating the phase of propagating light.

On the other hand, Japanese Patent Publication No. H2-269309A describes, in FIG. 9, that, in an amplitude modulator modulating the amplitude of incident light, a modulation voltage is impressed from asymmetric coplanar electrodes on a pair of branched waveguides of a Mach-Zehnder optical waveguide. In this type of electrodes, the respective widths of pair of gaps are different from each other.

Japanese Patent Publication No. 2005-91698A describes that, in an amplitude modulator modulating the amplitude of incident light, a modulation voltage is impressed from asymmetric coplanar electrodes on a pair of branched waveguides of a Mach-Zehnder optical waveguide. As a result, electric field intensities applied to the pair of branched waveguide are made different from each other, resulting in difference in the phase shifts caused by the modulation between light beams propagating through the respective branched waveguides. An object thereof is to obtain, as a result, a chirp characteristic.

Japanese Patent Publication No. 2004-219600A discloses that in CPW and ACPS Mach-Zehnder optical modulators, by setting a ratio of W/G, which is a ratio of the width W of a signal electrode to a gap G between a ground electrode and the signal electrode to 0.8 or more, and more preferably 2.5 or more, the electrode propagation loss can be reduced.

DISCLOSURE OF THE INVENTION

The present inventor had tried to produce an optical phase modulator which is high in operation stability, and a drive voltage of which is low after impedance matching has been carried out. For example, in the optical phase modulator according to "Band Operation of Guided-Wave Light Modulators with Filter-Type Coplanar Electrodes", IEICE TRANS. ELECTRON., VOL. E78-C, No. 1, January 1995, it is difficult to decrease the drive voltage after the characteristic impedance of the electrodes has been matched to the coaxial line. Further, since it does not have a structure as coplanar electrodes in which a signal electrode is arranged between ground electrodes, it has a defect that electric field confinement is weak, due to an discontinuous points in a bent portion of the signal electrode, a connection portion to a radio frequency coaxial cable, and the like, a radio frequency characteristic tends to show ripples.

In the respective modulators according to Japanese Patent Publication Nos. H2-269309A and 2005-91698A, a desired chirp characteristic is obtained by making the respective gap widths of the electrodes different from each other, thereby making the electric field intensities applied to the respective branched waveguides different from each other, for modulating the optical amplitude. However, it is an amplitude modulator which is to control the chirp characteristic so as to attain a desired characteristic, and the concept of the control of the chirp quantity cannot be applied to the optical phase modulator in which the chirp quantity is fixed to infinity. Moreover, since ACPW electrodes are used, when the characteristic impedance is matched for the amplitude modulation, the drive voltage will increase compared with a case in which ordinary symmetric CPW electrodes are used.

It is therefore an object of the present invention to provide an optical phase modulator which has high operation stability, and has a low drive voltage after the impedance has been matched.

An optical phase modulator of the present invention comprises:

a substrate comprising an electro-optical material;

a signal electrode provided on the substrate;

first and second ground electrodes provided on opposite sides of the signal electrode; and an optical phase modulation portion comprising an optical waveguide provided in a first gap between the first ground electrode and the signal electrode, wherein:

a size $G_1$ of the first gap between the first ground electrode and the signal electrode is smaller than a size $G_2$ of a second gap between the second ground electrode and the signal electrode;

an optical waveguide is not provided in the second gap; and a modulation voltage is applied on the first ground electrode and the signal electrode to modulate the phase of light propagating through the optical waveguide.

According to the present invention, the size $G_1$ of the first gap between the first ground electrode and the signal electrode is smaller than the size $G_2$ of the second gap between the second ground electrode and the signal electrode, and then, an optical waveguide is not provided in the second gap. Then, the phase of light propagating through the optical waveguide provided in the first gap is modulated by applying a modulation voltage on the first ground electrode and the signal electrode.

In this way, by providing the optical waveguide in the first gap, the operation stability can be increased. Then, the first gap width is made smaller than the second gap width, and the optical waveguide is provided in the narrower first gap and is not provided in the wider second gap. Since the first gap is narrower in width, the electric field intensity applied to the optical waveguide in the gap is large, and the drive voltage required for predetermined phase modulation decreases compared with a case of an ordinary symmetrical CPW electrodes. On the other hand, though the electric field intensity applied to the optical waveguide in the wider second gap becomes small, since the optical phase modulation is carried out, an optical waveguide is not formed in the second gap. Then, by providing the second gap wider in width, the characteristic impedance of the electrodes can be increased thereby promoting the impedance matching. Further, by providing the signal electrode between the two ground electrodes, the electric field confinement can be increased, thereby realizing excellent radio frequency characteristics without ripples.

In the optical phase modulator described in "Band Operation of Guided-Wave Light Modulators with Filter-Type Coplanar Electrodes", IEICE TRANS. ELECTRON., VOL. E78-C, No. 1, January 1995, if the gap is increased for characteristic impedance matching, the drive voltage required for the phase modulation increases.

Since the respective chirp optical amplitude modulators according to Japanese Patent Publication Nos. H2-269309A and 2005-91698A are modulators which provide the chirp characteristic by means of a difference in the phase shifts caused by the optical modulation between the gap narrower in width and the gap wider in width, due to the provided gap wider in width, the drive voltage required for the amplitude modulation increases. Moreover, unless one of the branched waveguides of the Mach-Zehnder optical waveguide is provided in the gap wider in width, the amplitude modulation cannot be carried out.

BEST MODES FOR CARRYING OUT THE INVENTION

A more detailed description will now be given of the present invention properly referring to drawings.

Figure 1:
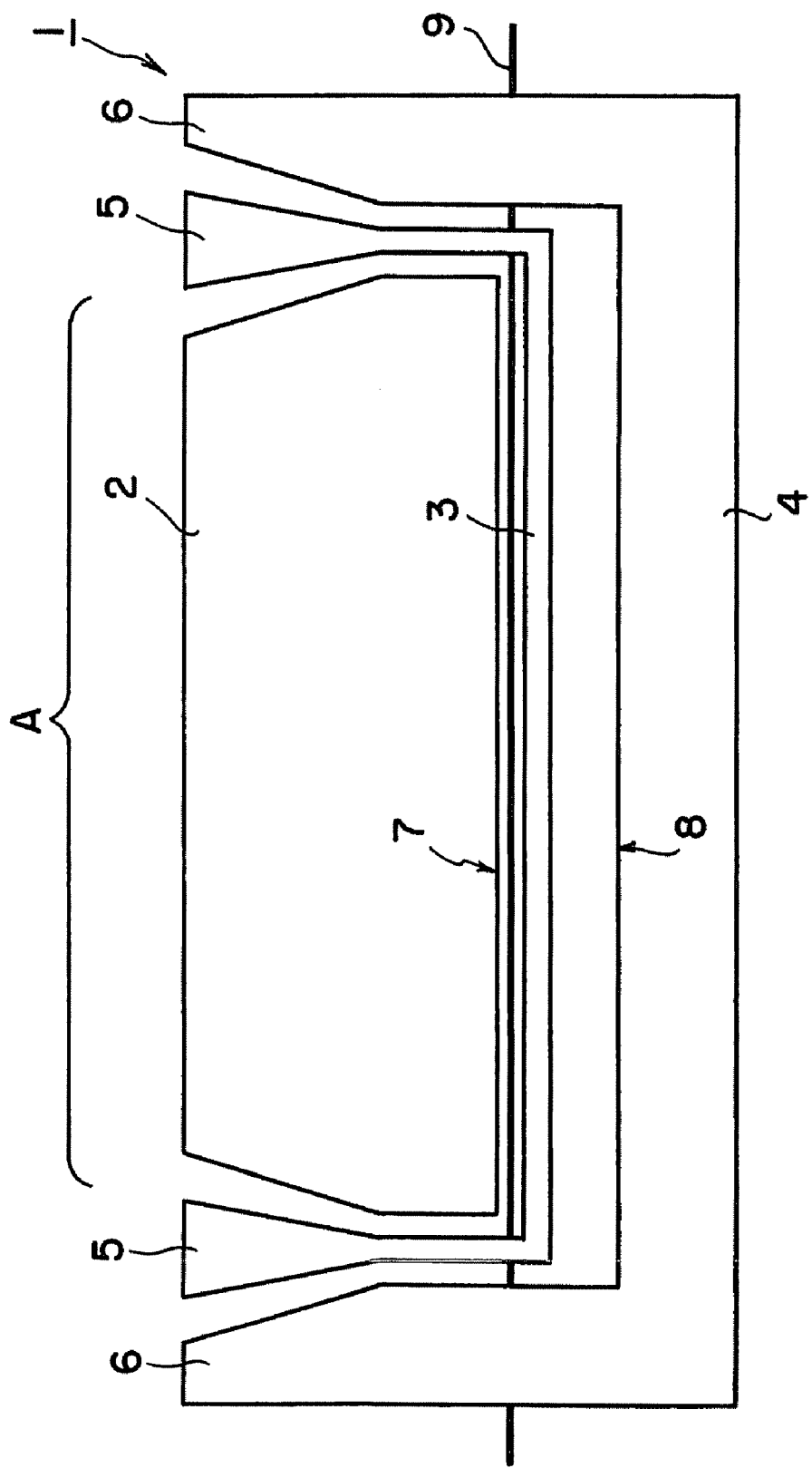
FIG. 1 is a plan view schematically showing an optical phase modulator 1 according to an embodiment of the present invention.
Figure 2:
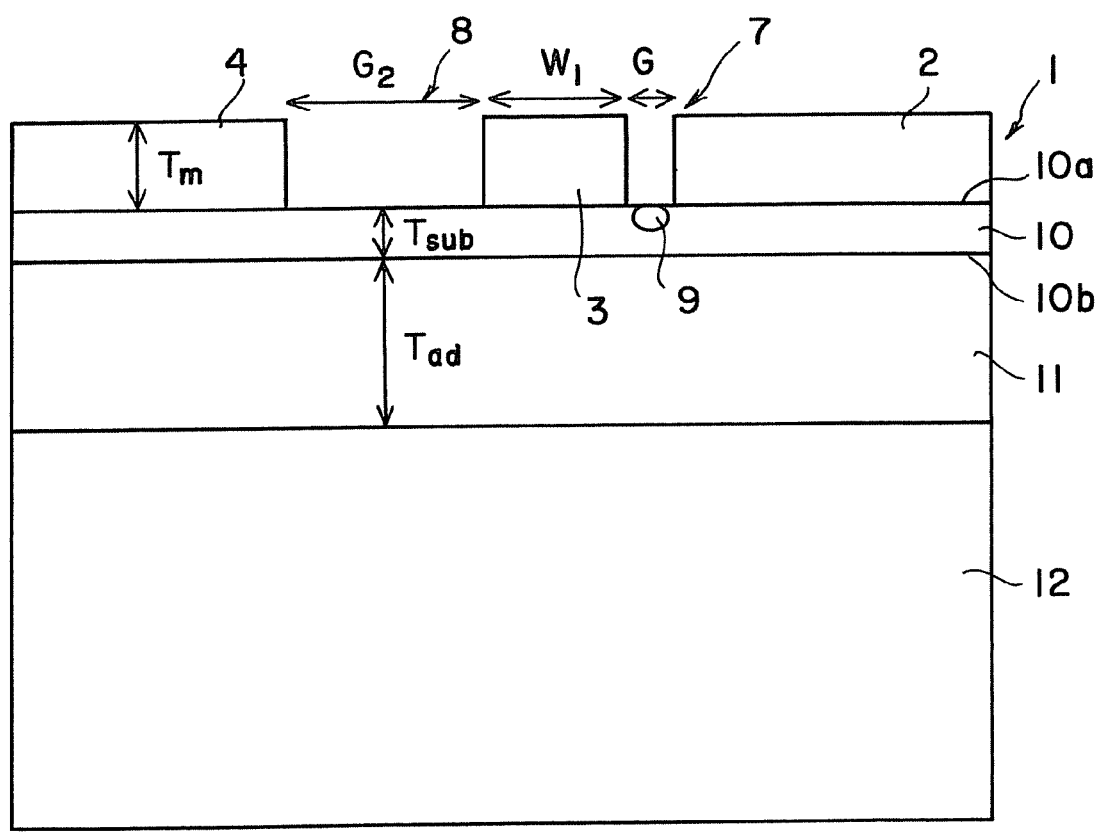
FIG. 2 is a cross sectional view of the optical phase modulator shown in FIG. 1.

FIG. 1 is a plan view schematically showing an optical modulator 1 according to the present invention, and FIG. 2 is a cross sectional view thereof (hatching is omitted). The optical modulator 1 is provided with a substrate 10 in a planar shape, for example. A signal electrode 3, a first ground electrode 2, and a second ground electrode 4 are formed on a surface 10a of the substrate 10. An optical waveguide 9 is formed in a first gap 7, and an optical waveguide is not formed in a second gap 8. A size (width) of the second gap 8 is larger than a size (width) of the first gap 7. Light propagating through the optical waveguide 9 is modulated by phase modulation by applying a signal voltage between the signal electrode 3 and the first ground electrode 2, thereby forming an optical phase modulation portion A. Reference numeral 5 denotes a power supply line to the signal electrode, and reference numeral 6 denotes a power supply line to the second ground electrode.

In the electrode gap 7 relatively narrower in width, since the electric field intensity applied to the optical waveguide is higher, though the drive voltage can be reduced, the characteristic impedance of the electrodes tends to decrease. On the other hand, the electrode gap 8 relatively wider in width does not modulate the light by the phase modulation, and tends to increase the characteristic impedance of the electrodes.

In the example shown in FIG. 2, the optical waveguide substrate 10 is joined to a support base 12 via a joining layer 11. As a result, even if the substrate 10 is thinned to 100 µm or less, for example, it is possible to prevent the substrate 10 from generating a crack while being handled.

According to the present invention, a material for constructing the substrate on which the optical waveguide and the electrodes are formed is a ferroelectric electro-optical material, preferably a single crystal. The crystal is not specifically limited as long as it can modulate light, and, lithium niobate, lithium tantalite, lithium niobate-lithium tantalite solid solution, potassium lithium niobate, KTP, GaAs and rock crystal can be examples thereof.

A material for the ground electrodes and the signal electrode is not specifically limited as long as it presents a low resistance, and is excellent in impedance characteristic, and the ground electrodes and the signal electrode can be constructed by any material such as gold, silver and copper.

According to a preferred embodiment, a buffer layer is not provided between the optical waveguide substrate and the electrodes. As a result, it is possible to further reduce the drive voltage required for the phase modulation of the light propagating through the optical waveguide. Especially, when $G_1$ is reduced extremely, if a buffer layer is present on the surface (under the electrodes) of the optical waveguide substrate, the distance between the modulation electrodes and the optical waveguide increases, the modulation electric field in the crosswise direction becomes very weak, and, as a result, even if $G_1$ is reduced, the drive voltage will not decrease, or, conversely, will increase. If there is no buffer layer, even if $G_1$ is reduced, the modulation electric field in the crosswise direction is efficiently impressed on the optical waveguide, and a lower drive voltage is realized for a narrower gap $G_1$.

The optical waveguide is formed in or on the substrate, and is preferably formed on the surface side of the substrate. The optical waveguide may be a ridge-type optical waveguide directly formed on the surface of the substrate, a ridge-type optical waveguide formed, via another layer, on the surface of the substrate, and an optical waveguide formed inside the substrate by an internal diffusion method or an ion exchange method such as titanium diffused optical waveguide, and a proton exchange optical waveguide. Though the electrodes are provided on the substrate surface side, the electrodes may be formed directly on the substrate surface, and may be formed on a buffer layer.

Though the type of an adhesive for adhering the substrate and the support base to each other is not specifically limited, the thickness thereof is preferably equal to or less than 300 µm. Moreover, for a low dielectric constant material used as the low dielectric constant layer, in terms of reduction of the propagation loss of a radio frequency modulated signal, a material having a low dielectric loss (low tan δ) is preferably employed. As the material with a low dielectric constant and a low dielectric loss as described above, Teflon and acryl adhesives can be exemplified. Moreover, as other low dielectric constant material, a glass adhesive, an epoxy adhesive, an inter-layer insulating material for semiconductor production, and a polyimide resin can be exemplified.

The optical phase modulator according to the present invention implies an optical phase modulator which applies phase modulation to incident light, and extracts a phase-modulated signal from emitted light. Thus, as long as the optical phase modulator is intended for the phase modulation, the type thereof is not limited, and various phase modulation such as DQPSK and SSB can be used. In an optical amplitude modulator using a Mach-Zehnder optical waveguide, though the phase of light is modulated in respective branched waveguides, beams of emitted light of the respective branched waveguides are multiplexed, thereby determining whether value is 0 (zero) or 1 (one) according to the amplitude of the multiplexed light. This corresponds to modulation of the amplitude of the emitted light (multiplexed light), and thus, does not correspond to the optical phase modulator according to the present invention.

According to the present invention, the size $G_1$ of the first gap between the first ground electrode and the signal electrode is smaller than the size $G_2$ of the second gap between the second ground electrode and the signal electrode. On this occasion, the ratio of $G_2$ to $G_1$ ($G_2/G_1$) is preferably equal to or more than 1.3, more preferably equal to or more than 2.0, and most preferably equal to or more than 3.0. Moreover, $G_1$ is preferably 2 to 30 µm, and more preferably 8 to 18 µm. Moreover, $G_2$ is preferably 3 to 200 µm, and more preferably 20 to 130 µm.

According to a preferred embodiment, the thickness of the substrate is equal to or less than 100 µm, and the substrate includes the support base, and the attachment layer that attaches the support base and the substrate to each other. This embodiment is shown in FIG. 2.

Moreover, according to a preferred embodiment, the optical phase modulator includes multiple optical phase modulation portions. In this embodiment, the first ground electrode or the second ground electrode of one of the optical phase modulation portions preferably forms a common ground electrode along with the first ground electrode or the second ground electrode of a neighboring one of the optical phase modulation portions. It is possible to reduce the size necessary for the optical phase modulation portions by forming the common ground electrode in this form, thereby contributing to the downsizing of the chip.

In this embodiment, the width of the common ground electrode is preferably wider than the width of the respective signal electrodes of the respective optical phase modulators, thereby preventing influence from the neighboring optical phase modulation portion. Moreover, though there is no upper limit for the width of the common ground electrode, in terms of the downsizing of the optical phase modulator chip, the width is preferably 300 µm or less, more preferably 200 µm or less, and still more preferably 150 µm or less.

Moreover, according to a preferred embodiment, the width of the common ground electrode is equal to the respective widths of the respective ground electrodes other than the common ground electrode. It should be noted that a manufacturing error is permitted on this occasion.

According to a preferred embodiment, the phases of the respective beams of light propagating through the multiple optical waveguides are modulated, the respective beams of modulated light are multiplexed, and information on the phase modulation is obtained from the multiplexed light.

Figure 3:
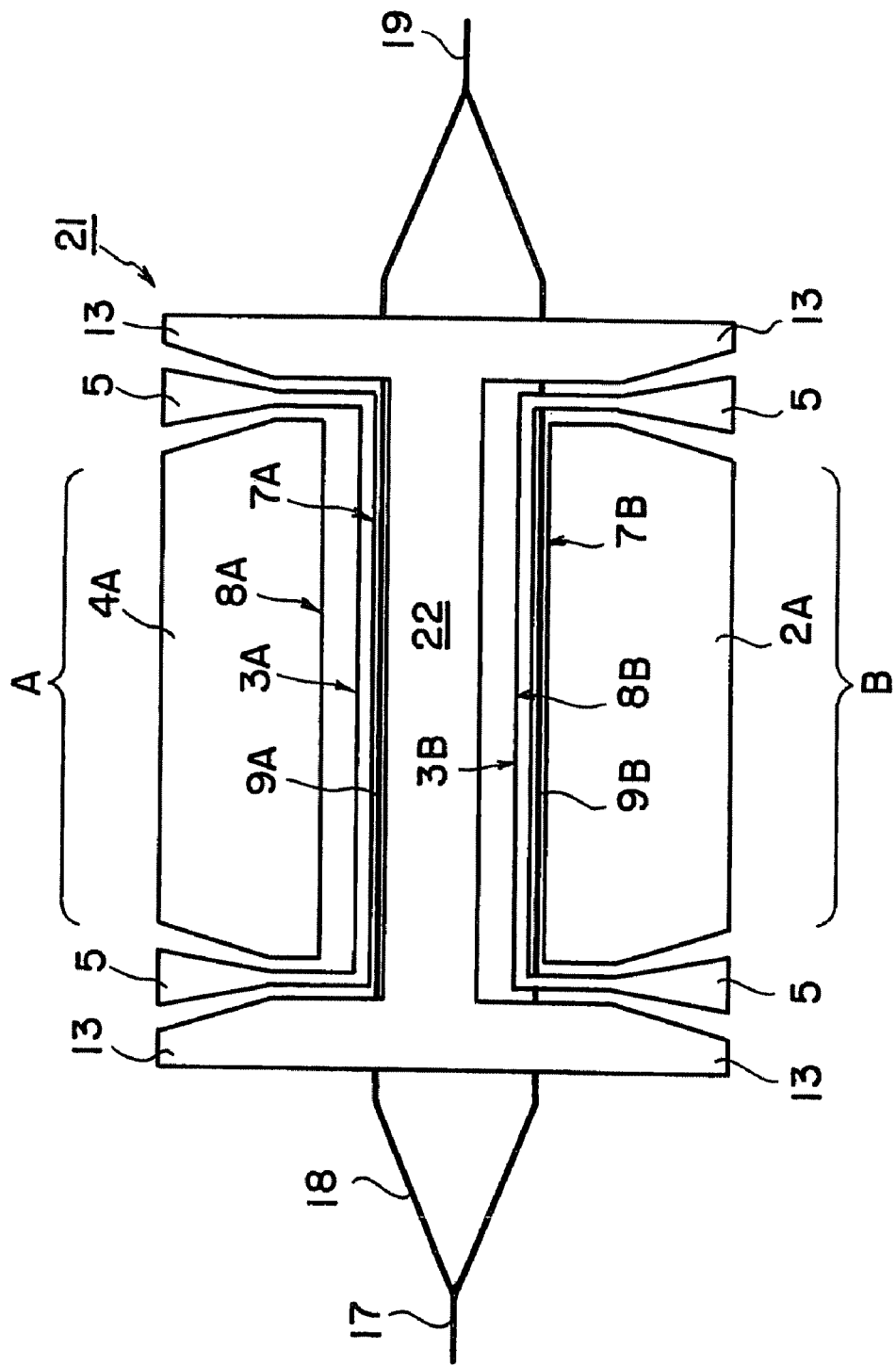
FIG. 3 is a plan view of an optical phase modulator 21 according to another embodiment of the present invention.
Figure 4:
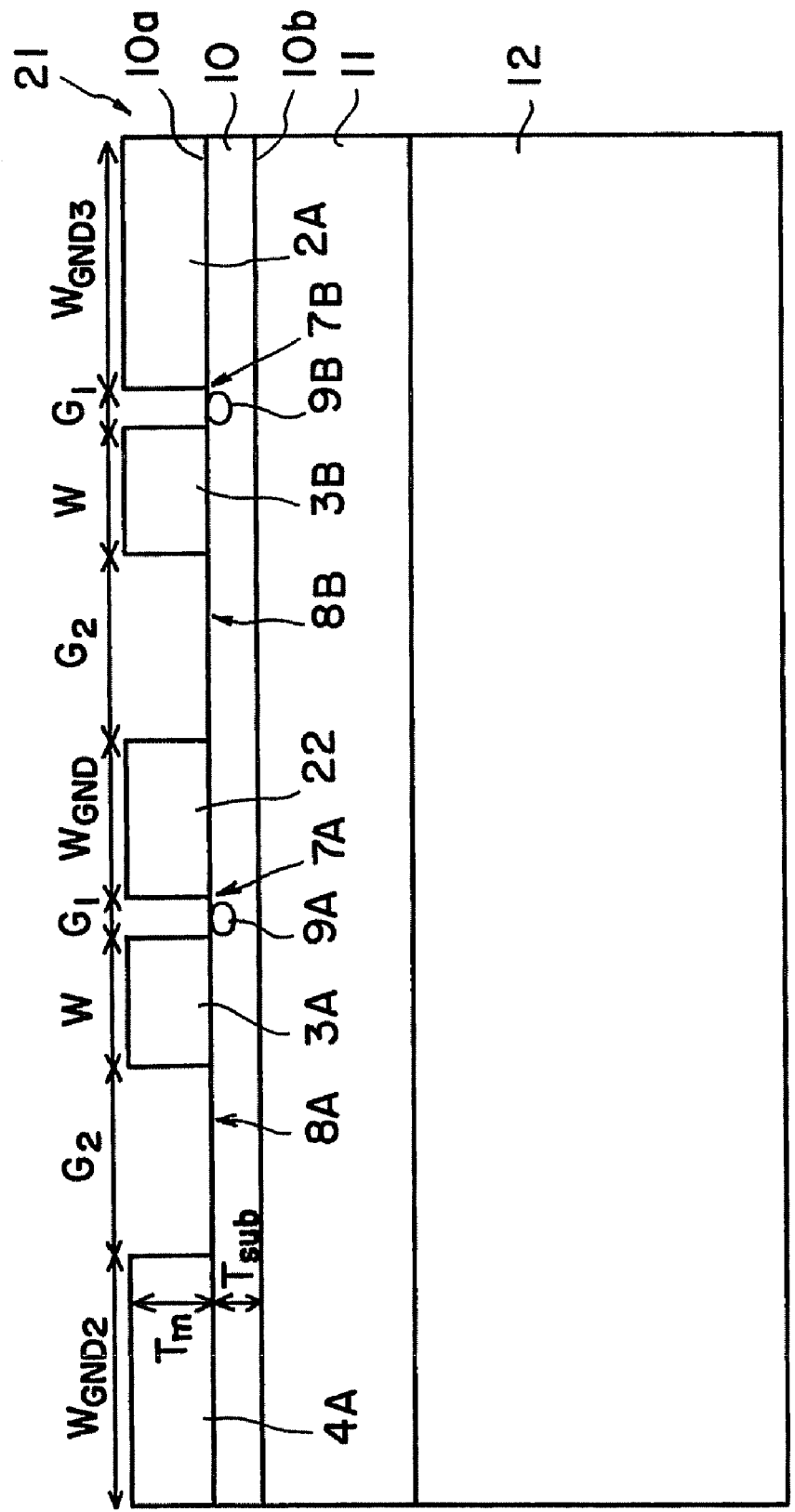
FIG. 4 is a cross sectional view of the optical phase modulators shown in FIGS. 3, 5 and 7.

FIG. 3 is a plan view schematically showing an optical modulator 21 according to another embodiment, and FIG. 4 is a cross sectional view thereof (hatching is omitted). The optical modulator 21 is provided with the substrate 10 in a planar shape, for example. Signal electrodes 3A and 3B, a common ground electrode 22, a first ground electrode 2A, and a second ground electrode 4A are formed on the surface 10a of the substrate 10. Optical waveguides 9A and 9B are formed in first gaps 7A and 7B, respectively. An optical waveguide is not formed in second gaps 8A and 8B. The sizes (widths) of the second gaps 8A and 8B are larger than the sizes (widths) of the first gaps 7A and 7B, respectively. Respective beams of light propagating through the optical waveguides 9A and 9B are modulated by phase modulation by applying signal voltages between the signal electrodes 3A and 3B and the first ground electrodes 22 and 2A, thereby forming optical phase modulation portions A and B, respectively. Reference numeral 5 denotes power supply lines to the signal electrodes, and reference numeral 13 denotes a power supply line to the common ground electrode.

In the electrode gaps 7A and 7B relatively narrower in width, since the electric field intensity applied to the optical waveguides is larger, though the drive voltages can be reduced, the characteristic impedances of the electrodes tend to decrease. On the other hand, the electrode gaps 8A and 8B relatively wider in width do not modulate the light by the phase modulation, and tend to increase the characteristic impedances of the electrodes.

In the example shown in FIG. 4, the optical waveguide substrate 10 is joined to the support base 12 via the joining layer 11. As a result, even if the substrate 10 is thinned, it is possible to prevent the substrate 10 from generating a crack while being handled.

Figure 5:
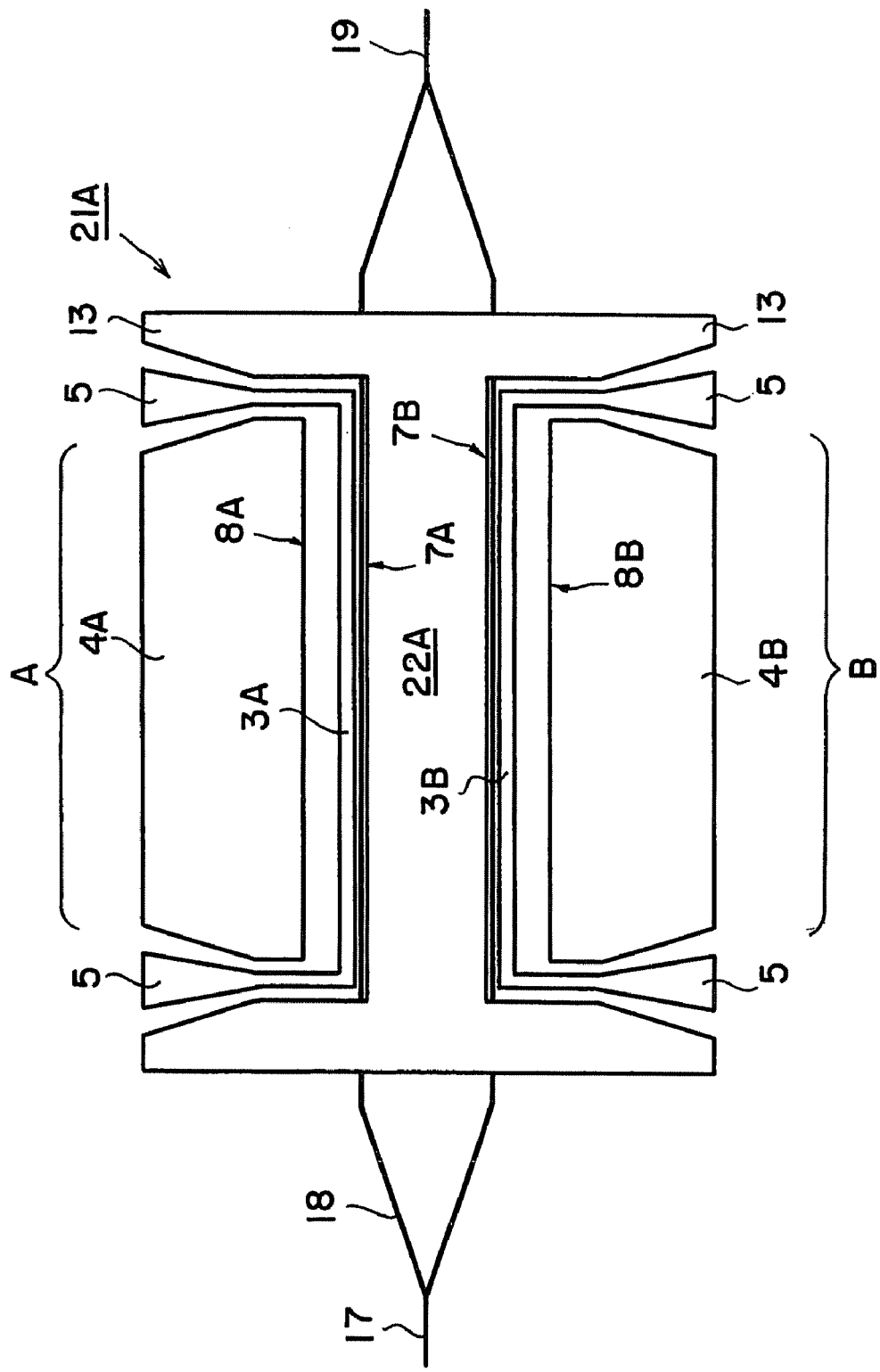
FIG. 5 is a plan view of an optical phase modulator 21A according to a still another embodiment of the present invention.

FIG. 5 is a plan view schematically showing an optical modulator 21A according to a still another embodiment. The cross section thereof is similar to that shown in FIG. 4. The optical modulator 21A is provided with the substrate 10 in a planar shape, for example. The signal electrodes 3A and 3B, a common ground electrode 22A, and second ground electrodes 4A and 4B are formed on the surface 10a of the substrate 10. The optical waveguides 9A and 9B are formed in the first gaps 7A and 7B, respectively. An optical waveguide is not formed in the second gaps 8A and 8B. The sizes (widths) of the second gaps 8A and 8B are larger than the sizes (widths) of the first gaps 7A and 7B, respectively. Respective beams of light propagating through the optical waveguides 9A and 9B are modulated by phase modulation by applying signal voltages between the signal electrodes 3A and 3B and the common ground electrode 22A, thereby forming the optical phase modulation portions A and B, respectively. Reference numeral 5 denotes the power supply lines to the signal electrodes, and reference numeral 13 denotes the power supply line to the common ground electrode.

According to the present embodiment, the optical waveguides form a Mach-Zehnder optical waveguide. In other words, light made incident from an incident portion 17 is branched in a branch portion 18, and branched beams of light are made incident to the respective optical waveguides 9A and 9B, and are independently modulated by the phase modulation. Then, beams of modulated light after the phase modulation are multiplexed at a multiplexing portion 19, and multiplexed light is output from the modulator. Information on a phase-modulated signal is obtained from the output modulated light.

The type of the phase modulation for the case in which the multiple optical phase modulation portions are used is not limited, and various phase modulation types such as DQPSK, SSB and DPSK may be employed. The respective types of the modulation themselves are known.

Figure 6:
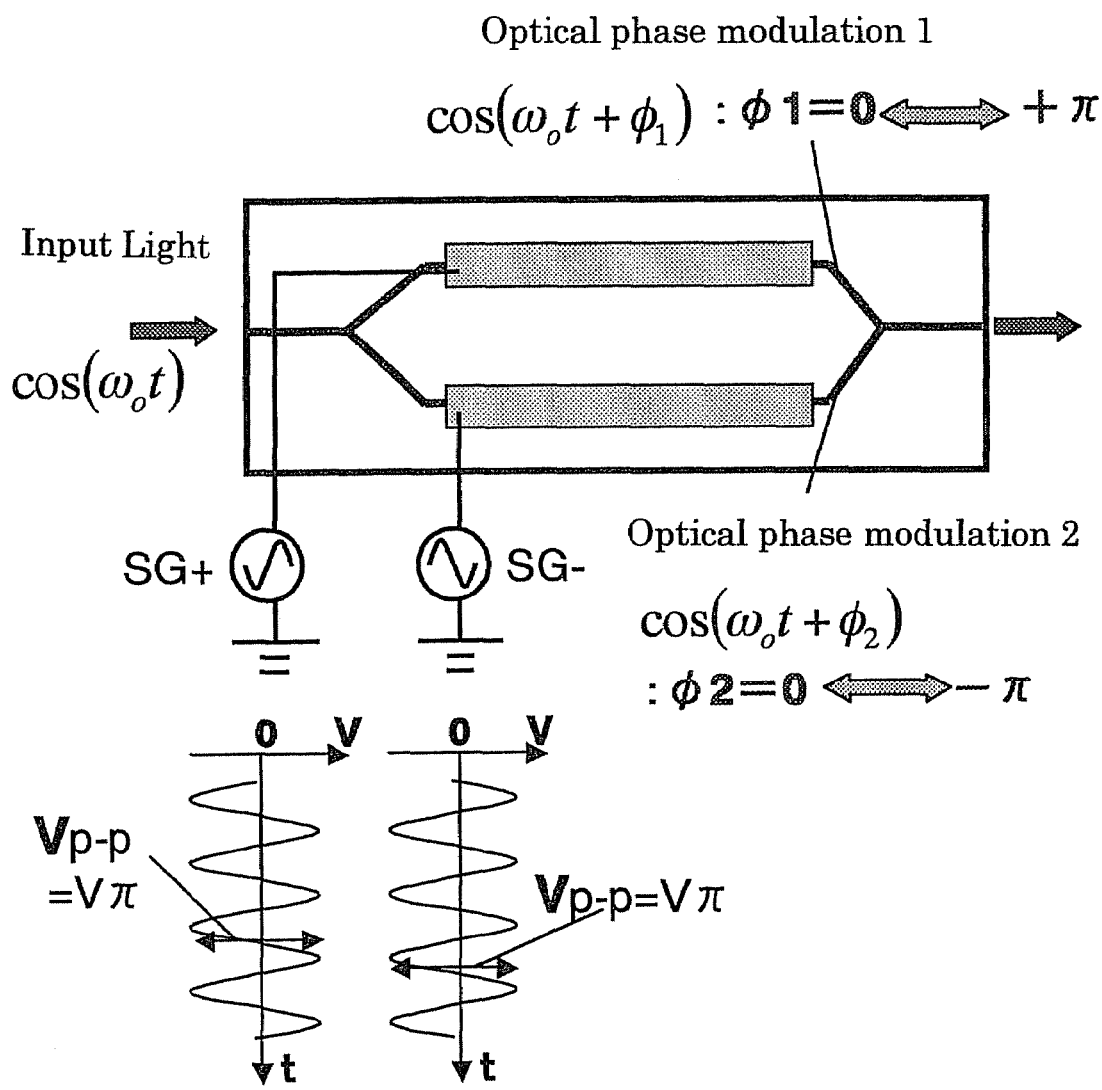
FIG. 6 is a schematic diagram describing the DPSK optical modulation.

For example, FIG. 6 is a schematic diagram showing an optical phase modulator for DPSK. The DPSK modulation stands for "Differential Phase Shift Keying" modulation. First, an input signal 1 (voltages are 0 and Vπ) is input to an input port 1. At the same time, a signal of opposite polarity 2 (voltages are 0 and −Vπ) of the input signal 1 is input to an input port 2.

As a result, the following two states arise:

State 1: 0 V on the input port 1, and 0 V on the input port 2, and

State 2: Vπ V on the input port 1, and −Vπ V on the input port 2.

Optical signals output in both of the states are both in states in which the light intensity is at the maximum. In other words, respective beams of the emitted light from both of branched waveguides 9A and 9B intensify each other upon the interference, and the light intensity thus takes the maximum value after the interference. The intensity of multiplexed light is represented by an equation 1. Then, the phase difference between both the states is π radian, and the DPSK modulation is thus enabled.

$$\cos(\omega_o t + \phi_3) = 2\cos\left(\frac{\phi_1 - \phi_2}{2}\right) \cdot \cos\left(\omega_o t + \frac{\phi_1 + \phi_2}{2}\right) \quad \text{Equation 1}$$

$$: \phi_3 = 0 \Longleftrightarrow \pi$$

On the other hand, a description will be given of a case in which the same signal (voltage: Vπ) is impressed on the two radio frequency input ports with reference to the modulator in FIG. 5 as an example. Due to the difference in the electrode arrangement, the direction of the line of electric force applied to the optical waveguides is different from those of the case shown in FIG. 3.

First, an input signal 1 (voltages are 0 and Vπ) is input to the input port 1. At the same time, a signal of opposite polarity 2 (voltages are 0 and −Vπ) of the input signal 1 is input to an input port 2.

As a result, the following two states arise:

State 1: 0V on the input port 1, and 0 V on the input port 2, and

State 2: VπV on the input port 1, and VπV on the input port 2.

Optical signals output in both of the states are both in states in which the light intensity is at the maximum. In other words, respective beams of the emitted light from both of branched waveguides 9A and 9B intensify each other upon the interference; the light intensity thus takes the maximum value after the interference. Then, the phase difference is π radian, and the DPSK modulation is thus enabled.

Obviously, the respective phase modulators in FIGS. 3 and 5 can be used for DQPSK (Differential Quadrature Phase Shift Keying) and SSB (Single Side Band amplitude modulation) in addition to DPSK.

When the common ground electrode is used, in terms of coinciding the drive voltages (half-wave voltages) for the two optical phase modulation portions, as describe before, the widths of the upper and lower ground electrodes ($W_{GND2}$ and $W_{GND3}$) and the width of the common ground electrode ($W_{GND}$) are preferably equal to each other (refer to FIG. 4).

Figure 7:
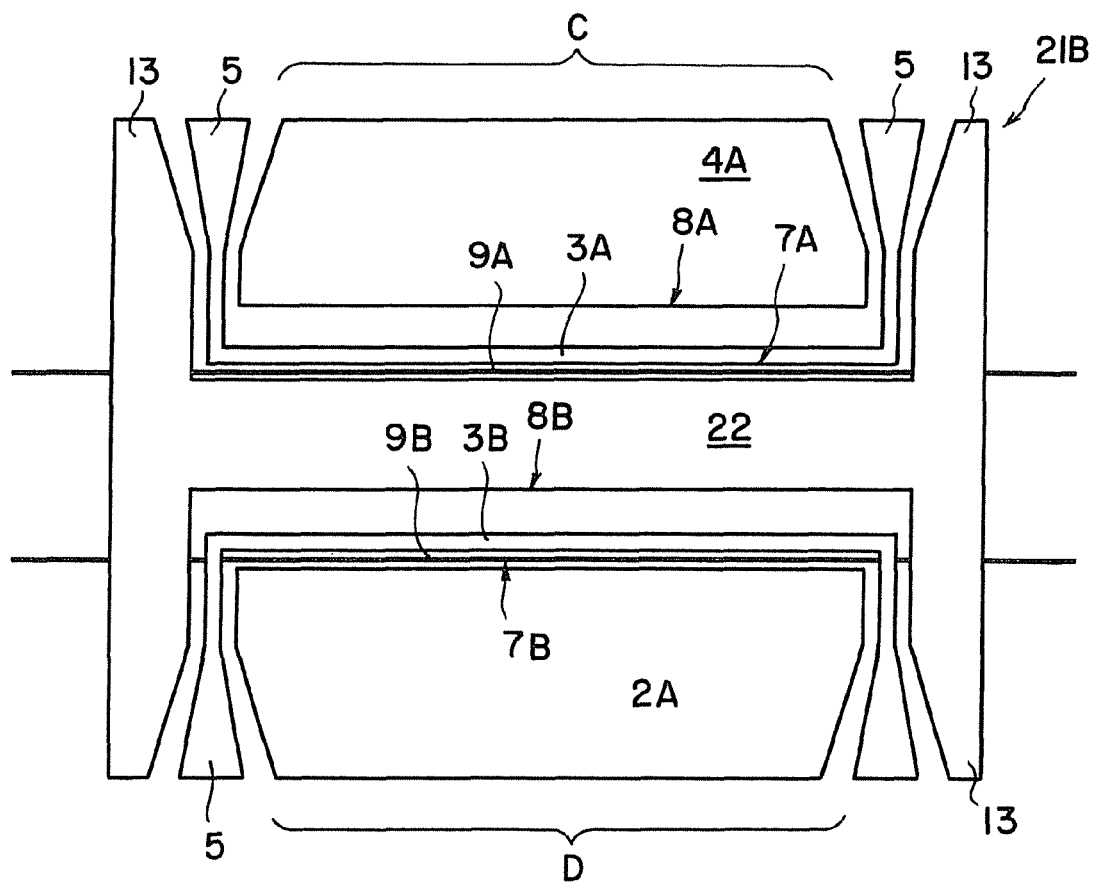
FIG. 7 is a plan view of an optical phase modulator 21B according to yet another embodiment of the present invention.

Moreover, the phases of the respective beams of light propagating through multiple optical waveguides can be independently modulated. FIG. 7 is a plan view schematically showing an optical phase modulator 21B according to yet another embodiment. The cross section thereof is similar to that shown in FIG. 4. The optical modulator 21B is provided with the substrate 10 in a planar shape, for example. The signal electrodes 3A and 3B, the common ground electrode 22, the first ground electrode 2A and second ground electrode 4A are formed on the surface 10a of the substrate 10. The optical waveguides 9A and 9B are formed in the first gaps 7A and 7B, respectively. An optical waveguide is not formed in the second gaps 8A and 8B. The sizes (widths) of the second gaps 8A and 8B are larger than the sizes (widths) of the first gaps 7A and 7B, respectively. Respective beams of light propagating through the optical waveguides 9A and 9B are modulated by phase modulation by applying signal voltages between the signal electrodes 3A and 3B and the respective ground electrodes, thereby forming optical phase modulation portions C and D, respectively. Reference numeral 5 denotes the power supply lines to the signal electrodes, and reference numeral 13 denotes the power supply line to the common ground electrode.

Then, modulated light modulated by the optical phase modulation portion C is emitted from the optical waveguide 9A, and the phase modulation signal is detected from the emitted light. Moreover, modulated light modulated by the optical phase modulation portion D is emitted from the optical waveguide 9B, and the phase modulation signal is detected from the emitted light.

According to a preferred embodiment, a ratio $W/G_1$ of the width W of the signal electrode to the size $G_1$ of the first gap is equal to or more than 2.3. As a result, the electrode loss decreases significantly. In this respect, $W/G_1$ is more preferably equal to or more than 4.0.

A larger $W/G_1$ is preferable in terms of reduction of the electrode loss. However, if $W/G_1$ excessively increases, the device becomes large, the characteristic impedance decreases, and the perfect velocity matching between the lightwave and the microwave becomes difficult. Therefore, $W/G_1$ is preferably equal to or less than 15.

If $G_2$ is excessively large, due to the asymmetry of the electrodes, ripples in terms of the radio frequency characteristics increases. Therefore, $G_2$ is preferably equal to or less than 1 mm, more preferably equal to or less than 500 microns, and still more preferably equal to or less than 150 microns.

EXAMPLES

First Example

The optical phase modulator 1 as shown in FIGS. 1 and 2 was produced, and a phase modulation experiment was carried out. Sizes are set as follows (refer to FIG. 2).

$G_1$=16 μm, $G_2$=92 μm, W=38 μm, $T_m$=20 μm, $T_{sub}$=7.0 μm, Tad=50 μm, and relative permittivity of the low dielectric constant layer 11: 4.0.

As the electric-optical substrate 10, an X-cut lithium niobate substrate was used. With this structure, the effective refractive index of microwave was 2.2, and the microwave and light are velocity-matched. The characteristic impedance was 43Ω. Moreover, the half-wave voltage Vπ decreased down to 3.3V when the interaction-length of the electrodes was 32 mm.

Second Example

The optical phase modulator 21 as shown in FIGS. 3 and 4 was produced, and a phase modulation experiment was carried out. It should be noted that the following dimensions were set.

W=40 μm, $G_1$=16.5 μm, $G_2$=90 μm, $W_{GND}$=$W_{GND2}$=$W_{GND3}$=100 μm, $T_{sub}$=7 μm, electrode thickness $T_m$=17 μm, and electrode interaction length L=3.2 cm.

As the electric-optical substrate 1, an X-cut lithium niobate substrate was used. With this structure, the effective refractive index of microwave was 2.2, and the microwave and light are velocity-matched. The following data were obtained under these conditions.

Electrode conductor loss α=0.33 dB·cm$^{-1}$·GHz$^{-1/2}$

Characteristic impedance Z=41 Ω

Half wave voltage Vπ=3.4 V

Product of half wave voltage and interaction length VπL=10.8 V·cm 3 dB band width ΔF3 dB=25 GHz

Third Example

Dependency on the ground electrode width $W_{GND}$ was investigated in the second example. In other words, in FIG. 4, only $W_{GND}$ was variously changed. As a result, when the ground electrode widths $W_{GND}$ were 50, 150, 200 and 500 μm, the electrode propagation loss α were respectively 0.34, 0.32 and 0.31 dB·cm$^{-1}$·GHz$^{-1/2}$. Even when $W_{GND}$ is decreased down to approximately 50 μm, it is appreciated that the electrode propagation loss does not change so much.

Fourth Example

Dependency on the electrode gap $G_1$ was investigated in the second example. In other words, in FIG. 4, only the electrode gap $G_1$ was variously changed. As a result, when the electrode gaps $G_1$ were 20, 13.5 and 10 μm, the drive voltage VπL were respectively 12.7, 9.2 and 7.5 V·cm. In this way, the drive voltage is significantly reduced by reducing the gap $G_1$.

Fifth Example

Dependency on the electrode gap $G_2$ was investigated in the second example. In other words, in FIG. 4, the LN substrate thickness $T_{sub}$ was set to 7 μm, and the electrode gaps $G_2$ was variously changed. As a result, when the electrode gaps $G_2$ were 40, 60, 90 and 150 μm, the characteristic impedance Z were changed to 36, 39, 41 and 42 Ω, respectively. In other words, the characteristic impedance significantly increases by increasing the electrode gap $G_2$.

Sixth Example

Dependency on the ground electrode gap $G_2$ was investigated in the second example. In other words, in FIG. 4, the LN substrate thickness $T_{sub}$ was set to 4.5 μm, and the electrode gaps $G_2$ were variously changed. As a result, when the electrode gaps $G_2$ were 40, 60, 90 and 150 μm, the characteristic impedance Z were changed to 45, 49, 51 and 52 Ω, respectively. In other words, the characteristic impedance significantly increases by increasing the electrode gap $G_2$.

Seventh Example

Dependency on the center conductor width W was investigated in the second example. In other words, when W were changed to 20, 60 and 100 μm, the electrode propagation loss α were respectively 0.36, 0.30 and 0.28 dB·cm$^{-1}$·GHz$^{-1/2}$.

Eighth Example

The optical phase modulator 1 as shown in FIGS. 1 and 2 was produced, and a phase modulation experiment was carried out. Sizes are set as follows (refer to FIG. 2).

$G_1$=13.5 μm, $G_2$=70 μm, $T_{sub}$=5.0 μm, $T_{ad}$=100 μm, and relative permittivity of the low dielectric constant layer 11: 4.0.

As the electric-optical substrate 10, an X-cut lithium niobate substrate was used. For this structure, detailed simulation was carried out using the FEM, and respective dimensional conditions which attain a state in which the microwave effective index is 2.2, and the characteristic impedance is approximately 45Ω were searched for. It should be noted that the signal electrode width W and the electrode thickness Tm were changed. As a result, respective dimensional conditions shown in a Table 1 were obtained. Then, for the respective dimensional conditions shown in Table 1, the electrode propagation loss α was calculated, and shown in the Table 1.

TABLE 1

| W/G$_1$ | W | T$_m$ | α |
|---|---|---|---|
| 1 | 13.5 | 13 | 0.327 |
| 1.5 | 20.25 | 11.5 | 0.303 |
| 2 | 27 | 10.3 | 0.284 |
| 2.3 | 31.05 | 9.5 | 0.275 |
| 2.5 | 33.75 | 9.2 | 0.27 |
| 3 | 40.5 | 8.3 | 0.258 |
| 3.5 | 47.25 | 7.5 | 0.247 |
| 4 | 54 | 6.8 | 0.237 |
| 4.5 | 60.75 | 6.1 | 0.229 |
| 5 | 67.5 | 5.6 | 0.222 |
| 5.5 | 74.25 | 5 | 0.216 |
| 6 | 81 | 4.4 | 0.21 |
| 6.5 | 87.75 | 4 | 0.205 |
| 7 | 94.5 | 3.5 | 0.2 |
| 7.5 | 101.25 | 3 | 0.195 |
| 8 | 108 | 2.5 | 0.192 |
| 8.5 | 114.75 | 2.3 | 0.188 |
| 9 | 121.5 | 1.8 | 0.184 |
| 9.5 | 128.25 | 1.4 | 0.181 |
| 10 | 135 | 1.1 | 0.178 |

Ninth Example

The optical phase modulator 1 as shown in FIGS. 1 and 2 was produced, and a phase modulation experiment was carried out. Sizes are set as follows (refer to FIG. 2).

$G_1$=16.5 μm, $G_2$=90 μm, $T_{sub}$=7.0 μm, $T_{ad}$=50 μm, and relative permittivity of the low dielectric constant layer 11: 4.0.

As the electric-optical substrate 10, an X-cut lithium niobate substrate was used. For this structure, detailed simulation was carried out using the FEM, and respective dimensional conditions which attain a state in which the microwave effective index is 2.2, and the characteristic impedance is approximately 45Ω were searched for. It should be noted that the signal electrode width W and the electrode thickness $T_m$ were changed. As a result, respective dimensional conditions shown in Table 2 were obtained. Then, for the respective dimensional conditions shown in Table 2, the electrode propagation loss α was calculated, and shown in the Table 2.

TABLE 2

| W/G | W | T$_m$ | α |
|---|---|---|---|
| 1 | 16.5 | 20.0 | 0.265 |
| 1.5 | 24.75 | 18.3 | 0.246 |
| 2 | 33 | 16.9 | 0.232 |
| 2.3 | 37.95 | 16.2 | 0.225 |
| 2.5 | 41.25 | 15.7 | 0.221 |
| 3 | 49.5 | 14.6 | 0.212 |
| 3.5 | 57.75 | 13.7 | 0.204 |
| 4 | 66 | 13.0 | 0.197 |
| 4.5 | 74.25 | 12.0 | 0.191 |
| 5 | 82.5 | 11.2 | 0.185 |
| 5.5 | 90.75 | 10.5 | 0.18 |
| 6 | 99 | 9.8 | 0.176 |
| 6.5 | 107.25 | 9.2 | 0.171 |
| 7 | 115.5 | 8.6 | 0.167 |
| 7.5 | 123.75 | 8.1 | 0.164 |
| 8 | 132 | 7.6 | 0.16 |
| 8.5 | 140.25 | 7.1 | 0.157 |
| 9 | 148.5 | 6.6 | 0.154 |
| 9.5 | 156.75 | 6.2 | 0.152 |
| 10 | 165 | 5.7 | 0.149 |
| 11 | 181.5 | 4.7 | 0.145 |
| 12 | 198 | 3.8 | 0.141 |

TABLE 2-continued

| W/G | W | $T_m$ | α |
|---|---|---|---|
| 13 | 214.5 | 3.0 | 0.138 |
| 14 | 231 | 2.4 | 0.135 |
| 15 | 247.5 | 1.6 | 0.133 |

As shown in the Tables 1 and 2, when $W/G_1$ is equal to or more than 2.3, and equal to or less than 15, and $G_2$ is equal to or more than $2G_1$, and equal to or less than 1 mm, the electrode loss can be especially reduced.

The invention claimed is:

1. An optical phase modulator comprising:
a substrate comprising an electro-optical material;
a signal electrode provided on the substrate;
first and second ground electrodes provided on both sides of the signal electrode; and
an optical phase modulation portion comprising an optical waveguide provided in a first gap between the first ground electrode and the signal electrode, wherein:
a size $G_1$ of the first gap between the first group electrode and the signal electrode is smaller than a size $G_2$ of a second gap between the second ground electrode and the signal electrode;
the entire second gap is free of an optical waveguide in a longitudinal direction; and
a modulation voltage is applied on the first ground electrode and the signal electrode to modulate the phase of light propagating through the optical waveguide.

2. The optical phase modulator of claim 1, further comprising a support base and a bonding layer bonding the support base and the substrate, wherein the substrate has a thickness equal to or less than 100 μm.

3. The optical phase modulator of claim 1, comprising a plurality of the optical phase modulation portions.

4. An optical phase modulator comprising:
a substrate comprising an electro-optical material;
a signal electrode provided on the substrate;
first and second ground electrodes provided on both sides of the signal electrode an optical phase modulation portion comprising an optical waveguide provided in a first gap between the first ground electrode and the signal electrode wherein:
a size $G_1$ of the first gap between the first group electrode and the signal electrode is smaller than a size $G_2$ of a second gap between the second ground electrode and the signal electrode;
an optical waveguide is not provided in the second gap;
a modulation voltage is applied on the first ground electrode and the signal electrode to modulate the phase of light propagating through the optical waveguide; and
a plurality of the optical phase modulation portions,
wherein either one of the first ground electrode and the second ground electrode of one of the plurality of optical phase modulation portions forms a common ground electrode along with either one of the first ground electrode and the second ground electrode of a neighboring one of the optical phase modulation portions.

5. The optical phase modulator of claim 4, wherein the common ground electrode has a width equal to or more than the width of the signal electrode and equal to or less than 300 μm.

6. The optical phase modulator of claim 3, wherein the phases of the respective beams of light propagating through a plurality of the optical waveguides are independently modulated.

7. The optical phase modulator of claim 3, wherein the phases of the respective beams of light propagating through the plurality of optical waveguides are modulated, the respective beams of modulated light are multiplexed, and information on the phase modulation Is obtained from the multiplexed light.

8. The optical phase modulator of claim 1, wherein a ratio $W/G_1$ of width W of the signal electrode to the size $G_1$ of the first gap is equal to or more than 2.3.

9. The optical phase modulator of claim 1, wherein a ratio of $G_2/G_1$ of the size $G_2$ of the second gap to the size $G_1$ of the first gap is equal to or more than 2.0.

10. The optical phase modulator of claim 2, comprising a plurality of the optical phase modulation portions.

* * * * *